US012677269B2

(12) United States Patent
Tian

(10) Patent No.: US 12,677,269 B2
(45) Date of Patent: Jul. 7, 2026

(54) INFORMATION TRANSMISSION METHOD

(71) Applicant: GUANGDONG OPPO MOBILE TELECOMMUNICATIONS CORP., LTD., Dongguan (CN)

(72) Inventor: Wenqiang Tian, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 275 days.

(21) Appl. No.: 18/351,332

(22) Filed: Jul. 12, 2023

(65) Prior Publication Data

US 2023/0362913 A1      Nov. 9, 2023

Related U.S. Application Data

(63) Continuation of application No. PCT/CN2021/071558, filed on Jan. 13, 2021.

(51) Int. Cl.
*H04W 72/12*          (2023.01)
*H04W 72/232*        (2023.01)
*H04W 88/04*          (2009.01)

(52) U.S. Cl.
CPC ......... *H04W 72/12* (2013.01); *H04W 72/232* (2023.01); *H04W 88/04* (2013.01)

(58) Field of Classification Search
None
See application file for complete search history.

(56) References Cited

U.S. PATENT DOCUMENTS

| | | | |
|---|---|---|---|
| 2011/0143799 A1 | 6/2011 | Abu-Alhiga et al. |
| 2017/0325205 A1 | 11/2017 | Zhou et al. |

(Continued)

FOREIGN PATENT DOCUMENTS

| | | |
|---|---|---|
| CN | 104812077 A | 7/2015 |
| CN | 105682243 A | 6/2016 |

(Continued)

OTHER PUBLICATIONS

Author Unknown, Summary for AI 8.11.2.2 Feasibility and benefits for mode 2 enhancements, pp. 1-22, Aug. 17, 2020.*

(Continued)

*Primary Examiner* — Christopher M Crutchfield
(74) *Attorney, Agent, or Firm* — Ladas & Parry, LLP

(57) ABSTRACT

The present application relates to the field of mobile communications. Disclosed are an information transmission method. The method includes: transmitting first scheduling information to a second device, wherein the first scheduling information is configured to indicate the first device to transmit first resource information and a first transmission mode for transmitting first information and second resource information and a second transmission mode for transmitting second information to the second device; transmitting the first information to the second device based on the first scheduling information, and receiving the second information transmitted by the second device based on the first scheduling information and the first information; or receiving the second information transmitted by the second device based on the first scheduling information, and transmitting the first information to the second device based on the first scheduling information and the second information.

18 Claims, 10 Drawing Sheets

(56)                References Cited

U.S. PATENT DOCUMENTS

| | | | | |
|---|---|---|---|---|
| 2019/0007974 | A1* | 1/2019 | Nguyen | .................. H04L 67/12 |
| 2020/0305179 | A1 | 9/2020 | Li | |
| 2020/0374858 | A1* | 11/2020 | Vargas | .................. H04W 72/25 |
| 2022/0303059 | A1* | 9/2022 | Hahn | .................... H04L 1/1893 |
| 2022/0400484 | A1* | 12/2022 | Lee | ....................... H04W 72/20 |

FOREIGN PATENT DOCUMENTS

| | | |
|---|---|---|
| CN | 111988859 A | 11/2020 |
| WO | 2015114451 A2 | 8/2015 |

OTHER PUBLICATIONS

Wenqi Shi, Sheng Zhou, Zhisheng Niu,, Miao Jiang, and Lu Geng, Joint Device Scheduling and Resource Allocation for Latency Constrained Wireless Federated Learning, pp. 453-467, Sep. 28, 2020.*

M. Isaksson and K. Norrman, "Secure Federated Learning in 5G Mobile Networks," Globecom 2020—2020 IEEE Global Communications Conference, Taipei, Taiwan, pp. 1-6, Dec. 11, 2020.*

Z. Yang, M. Chen, W. Saad, C. S. Hong and M. Shikh-Bahaei, "Energy Efficient Federated Learning Over Wireless Communication Networks," in IEEE Transactions on Wireless Communications, vol. 20, No. 3, pp. 1935-1949, Nov. 19, 2020.*

H. H. Yang, Z. Liu, T. Q. S. Quek and H. V. Poor, "Scheduling Policies for Federated Learning in Wireless Networks," in IEEE Transactions on Communications, vol. 68, No. 1, pp. 317-333, Sep. 2019.*

Author Unknown, Inter-UE coordination for NR V2X, pp. 1-6, Doc. No. R2-2010583, Nov. 13, 2020.*

Author Unknown, Discussion on sidelink resource allocation enhancements in mode2, pp. 1-4, Doc. No. R2-2009869, Nov. 13, 2020.*

European Search Repor from the corresponding European Patent Application No. 21918291.2, mailed Feb. 1, 2024 (8 pages).

International Search Report, International Application No. PCT/CN2021/071558, mailed Oct. 20, 2021.

Written Opinion of the International Searching Authority in International Application No. PCT/CN2021/071558, mailed on Oct. 20, 2021, with English translation provided by WIPO and applicant's foreign counsel.

First Office Action of the corresponding European patent application No. 21918291.2, issued on Feb. 11, 2026.

* cited by examiner training set       neural network to be trained test data       trained neural network

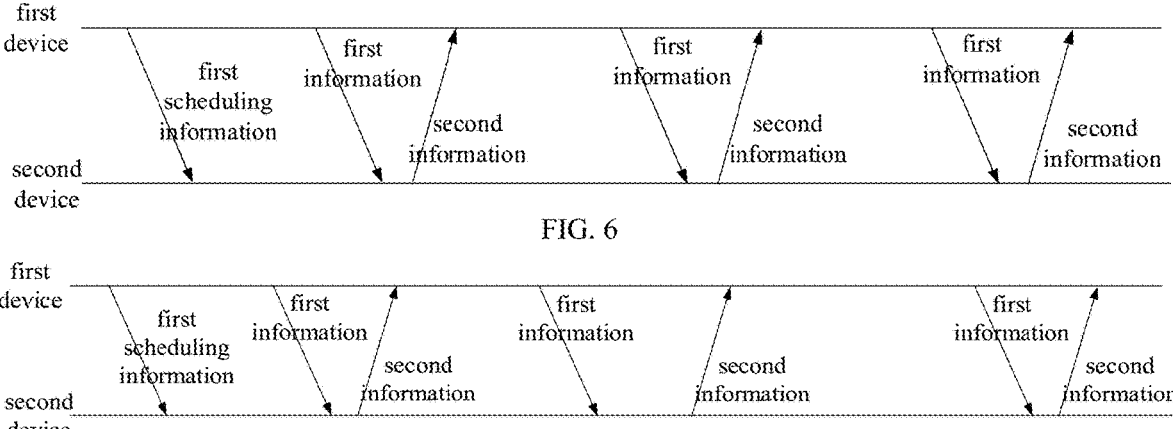
FIG. 6
FIG. 7
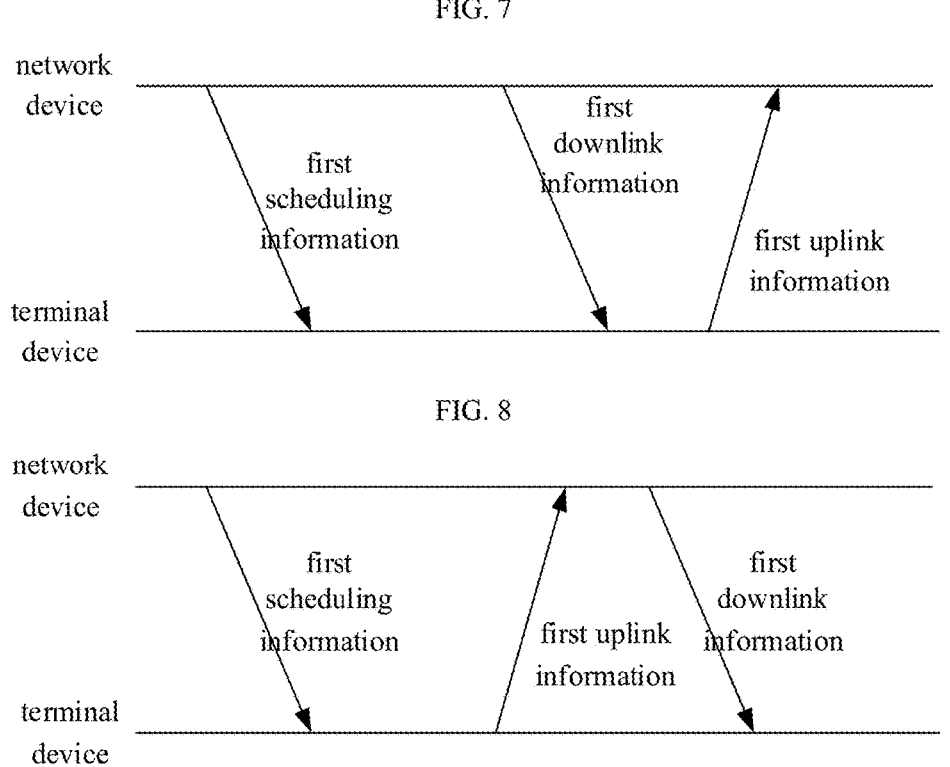
FIG. 8
FIG. 9

INFORMATION TRANSMISSION METHOD

CROSS REFERENCE TO RELATED APPLICATIONS

The present disclosure is a continuation of International Patent Application No. PCT/CN2021/071558, filed on Jan. 13, 2021, the contents of which is herein incorporated by reference in their entireties.

TECHNICAL FIELD

The present disclosure relates to the field of mobile communication, in particular to an information transmission method.

BACKGROUND

Currently, with the rapid development of mobile communication technologies and the wide application of terminal devices, uplink information or downlink information may be transmitted between a terminal device and a network device to achieve communication between the terminal device and the network device.

The network device may respectively transmit the first scheduling information required for transmitting the downlink information and the second scheduling information required for transmitting the uplink information to the terminal device. In this way, the network device may transmit the downlink information to the terminal device based on the first scheduling information, and the terminal device may transmit the uplink information to the network device based on the second scheduling information.

However, the network device is required to respectively transmit the scheduling information required for transmitting the uplink information and transmitting the downlink information to the terminal device, and transmission resources are consumed.

SUMMARY

Some embodiments of the present disclosure provide an information transmission method. The technical schemes are as follows.

According to some aspects of the present disclosure, an information transmission method is provided. The method is applied to a first device, and includes: transmitting first scheduling information to a second device, the first scheduling information is configured to indicate resource information and a transmission mode for transmitting first information, and resource information and a transmission mode for transmitting second information; transmitting the first information to the second device based on the first scheduling information, and receiving the second information transmitted by the second device based on the first scheduling information and the first information; or receiving the second information transmitted by the second device based on the first scheduling information, and transmitting the first information to the second device based on the first scheduling information and the second information.

According to some aspects of the present disclosure, an information transmission method is provided. The method is applied to a second device, and includes: receiving first scheduling information transmitted by a first device, the first scheduling information is configured to indicate resource information and a transmission mode for transmitting first information, and resource information and a transmission mode for transmitting second information; receiving the first information transmitted by the first device based on the first scheduling information, and transmitting the second information to the first device based on the first scheduling information and the first information; or transmitting the second information to the first device based on the first scheduling information, and receiving the first information transmitted by the first device based on the first scheduling information and the second information.

According to some aspects of the present disclosure, an information transmission method is provided. The method is applied to a first device, and includes: receiving paired second scheduling information and third scheduling information transmitted by a second device, the paired second scheduling information and third scheduling information is a group selected by the second device from at least one group of paired second scheduling information and third scheduling information, the second scheduling information is configured for the first device to transmit resource information and a transmission mode for transmitting first information to the second device, and the third scheduling information is configured for the second device to transmit resource information and a transmission mode for transmitting second information to the first device; transmitting the first information to the second device based on the second scheduling information in the selected group, and receiving the second information transmitted by the second device based on the third scheduling information in the selected group and the first information; or receiving the second information transmitted by the second device based on the third scheduling information in the selected group, and transmitting the first information to the second device based on the second scheduling information in the selected group and the second information.

BRIEF DESCRIPTION OF THE DRAWINGS

In order to explain the technical schemes in embodiments of the present disclosure more clearly, the following will briefly introduce the figures needed in the description of the embodiments. Obviously, the figures in the following description are only some embodiments of the present disclosure. For those skilled in the art, other figures may also be obtained according to these figures.

FIG. 6 shows a schematic view of transmitting information between a first device and a second device according to some embodiments of the present disclosure.

FIG. 7 shows a schematic view of transmitting information between a first device and a second device according to some embodiments of the present disclosure.

FIG. 8 shows a schematic view of transmitting information between a network device and a terminal device according to some embodiments of the present disclosure.

FIG. 9 shows a schematic view of transmitting information between a network device and a terminal device according to some embodiments of the present disclosure.

DETAILED DESCRIPTIONS

In order to make the purposes, technical schemes, and advantages of the present disclosure more clearly, embodiments of the present disclosure will be described in detail below in combination with the accompanying figures.

Firstly, an application scenario of the present disclosure is described.

Figure 1:
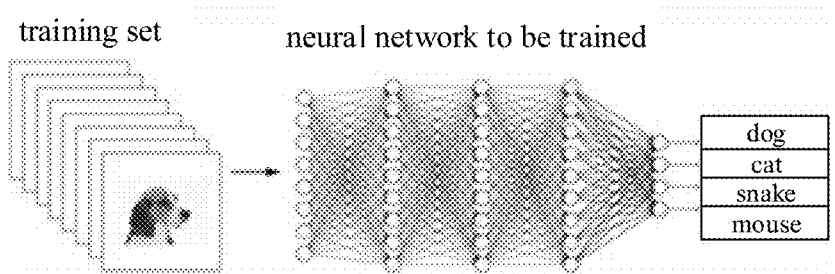
FIG. 1 shows a schematic view of training a neural network model according to some embodiments of the present disclosure.
Figure 2:
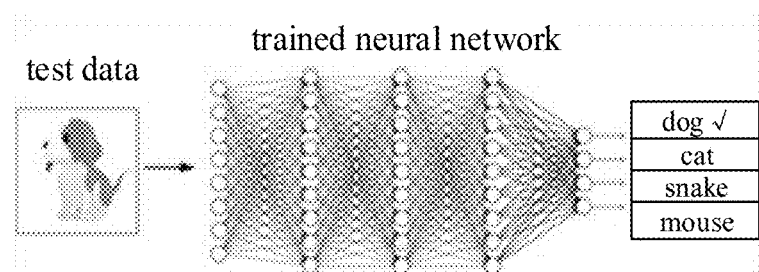
FIG. 2 shows a schematic view of using the neural network model according to some embodiments of the present disclosure.

In the field of Artificial Intelligence (AI), neural network is a widely used network. Before using the neural network, it is required to train the neural network. In a training process, a training set including a plurality of pieces of training data is obtained. Multiple trainings and parameter iterations are performed by using the training set as input parameters of the neural network. In this way, parameters of the neural network may be determined, and the training process of the neural network may be completed. For example, as shown in FIGS. 1 and 2, for the neural network, the training process is a reasoning process of the neural network. The neural network to be trained is trained by using a training set including a plurality of images of dogs. In response to the training of the neural network being completed, the dogs in the images may be recognized. In this way, the neural network may have an ability to recognize objects.

Figure 3:
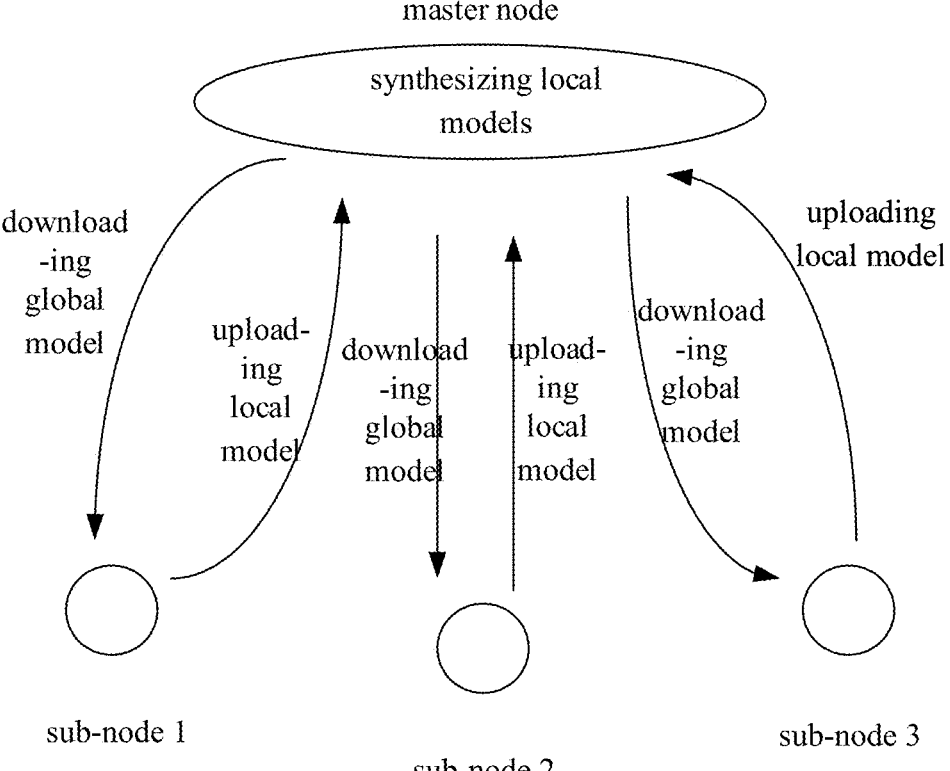
FIG. 3 shows a schematic flow chart of federated learning according to some embodiments of the present disclosure.

The training of the neural network model in the aforementioned process is centralized. Due to factors of protecting the user's privacy, a training method of federated learning is proposed. For example, as shown in FIG. 3, in the training process of the neural network model, the training set is distributed on a plurality of sub-nodes. Each of the sub-nodes generates a local model based on a local training set and uploads the local model to a master node. The master node synthesizes the obtained local models to obtain a global model, and transmits the global model to each of the sub-nodes. Each of the sub-nodes continues to use a new global model for a next training iteration. Finally, the training of the model is completed under the cooperation of the plurality of nodes.

The method provided by some embodiments of the present disclosure is applied to the training method of federated learning. In each iteration, a process that the sub-node transmits a local neural network to the master node, and the master node transmits a global neural network to the sub-node occurs, which also indicates that, in the federated learning, in response to the sub-node transmitting information to the master node for one time, the master node also transmits information to the sub-node for one time. Before transmitting information, it is necessary to schedule a resource information and a transmission mode required for transmitting information. Therefore, by using the method provided by some embodiments of the present disclosure, the master node may transmit scheduling information to the sub-node, which may not only schedule the resource information and the transmission mode for the master node to transmit information to the sub-node, but also schedule the resource information and the transmission mode for the sub-node to transmit information to the master node. In this way, the process of transmitting information between the sub-node and the master node may be achieved.

Figures 4, 5:
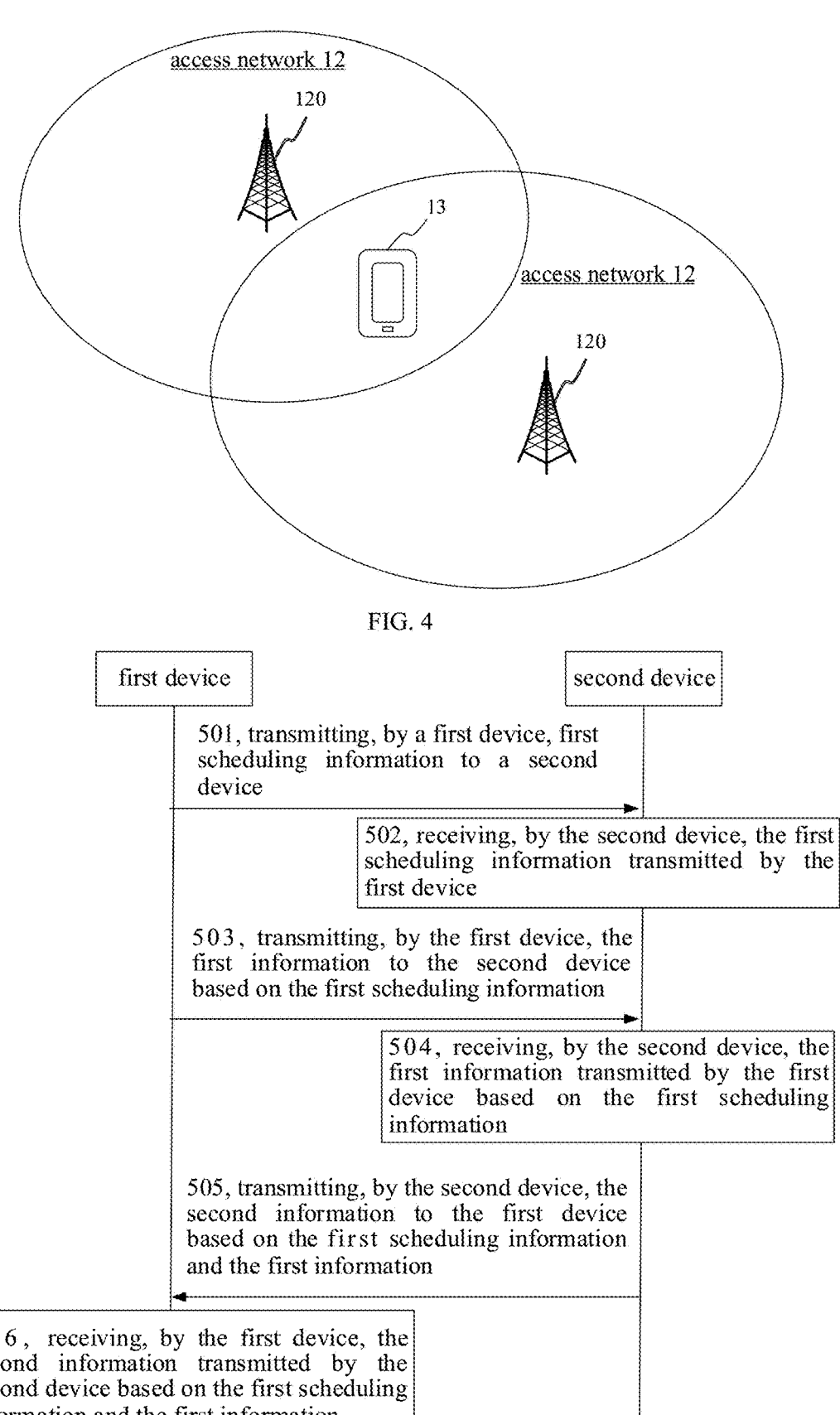
FIG. 4 shows a block diagram of a communication system according to some embodiments of the present disclosure.
FIG. 5 shows a flow chart of an information transmission method according to some embodiments of the present disclosure.

FIG. 4 shows a block diagram of a communication system according to some embodiments of the present disclosure. The communication system may include an access network 12 and a terminal 13.

The access network 12 includes several network devices 120. The network device 120 may be a base station. The base station is a device deployed in the access network to provide wireless communication functions for the terminal. The base station may include various forms of macro base stations, micro base stations, relay stations, access points, etc. In systems with different wireless access technologies, the names of the devices with the function of the base station may be different from each other. For example, in a Long Term Evolution (LTE) system, the device with the function of the base station may be called as eNodeB or eNB. In a 5G New Radio based access to unlicensed spectrum (NR-U) system, the device with the function of the base station may be gNodeB or gNB. With the evolution of communication technology, the description of "base station" may change. For convenience, in some embodiments of the present disclosure, the afore-mentioned devices that provide the wireless communication functions for the terminal 13 are collectively referred to as access network devices.

The terminal 13 may include various handheld devices, on-board devices, wearable devices, computing devices, or other processing devices connected to wireless modems, as well as various forms of user devices, mobile stations (MS), terminals, and so on, which have the wireless communication functions. For the convenience of description, the afore-mentioned devices are collectively referred to as terminals. The access network device 120 and the terminal 13 may communicate with each other through some air technologies, such as an Uu interface.

Technical schemes of some embodiments of the present disclosure may be applied to various communication systems, such as a Global System of Mobile communication (GSM) system, a Code Division Multiple Access (CDMA) system, a Broadband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, an Advanced Long Term Evolution (LTE-A) system, a New Radio (NR) system, an evolution system of the NR system, a LTE-based access to unlicensed spectrum (LTE-U), a NR-based access to unlicensed spectrum (NR-U) system, a Universal Mobile Telecommunications System (UMTS), a World Interoperability for Microwave Access (WiMAX) communication system, a Wireless Local Area Networks (WLAN), a Wireless Fidelity (WiFi), a next-generation communication system, or other communication systems.

Generally-speaking, a traditional communication system supports a limited number of connections and is easy to implement. However, with the development of communication technology, a mobile communication system may not only support a traditional communication, but also support, for example, a device to device (D2D) communication, a machine to machine (M2M) communication, a Machine Type Communication (MTC), a Vehicle to Vehicle (V2V) communication, and a Vehicle to Everything (V2X) system. Some embodiments of the present disclosure may also be applied to these communication systems.

FIG. 5 shows a flow chart of an information transmission method according to some embodiments of the present disclosure. The information transmission method may be applied to the terminal and the network device shown in FIG. 4. The method includes at least a part of the following contents.

At 501, the method includes transmitting, by a first device, first scheduling information to a second device.

At 502, the method includes receiving, by the second device, the first scheduling information transmitted by the first device.

When the first device is required to communicate with the second device, the resource information and the transmission mode required for transmission is required to be scheduled firstly. The first device may transmit the first scheduling information to the second device, so as to schedule the resource information and the transmission mode required for information transmission.

The first scheduling information is configured to indicate resource information and a transmission mode for transmitting first information, and resource information and a transmission mode for transmitting second information.

In some embodiments of the present disclosure, after the first device and the second device determine the resource information and the transmission mode for transmitting the first information and the resource information and the transmission mode for transmitting the second information, the first information and the second information may be transmitted between the first device and the second device. In the transmission process, the first information and the second information are correspondingly transmitted, which also indicates that the first information and the second information are pieces of information paired with each other, and the first information and second information exist in pairs. For example, the first device firstly transmits the first information to the second device, and then the second device transmits the second information to the first device based on the first information. Alternatively, the second device firstly transmits the second information to the first device, then the first device transmits the first information to the second device based on the second information.

In some embodiments of the present disclosure, the resource information refers to a position of a channel occupied during the information transmission. The transmission mode is a mode used during the information transmission.

For example, the resource information refers to time-domain resources and frequency-domain resources occupied for information transmission. The transmission mode includes at least one of: an encoding mode on information, a power controlling mode, a frequency hopping mode, and pilot information.

In some embodiments, the resource information for transmitting the first information includes at least one of: time-domain resource information for transmitting the first information, and frequency-domain resource information for transmitting the first information.

The resource information for transmitting the second information includes at least one of: time-domain resource information for transmitting the second information, and frequency-domain resource information for transmitting the second information. The first scheduling information also includes: difference information between the time-domain resource information for transmitting the first information and the time-domain resource information for transmitting the second information, and difference information between the frequency-domain resource information for transmitting the first information and the frequency-domain resource information for transmitting the second information.

It should be noted that, in a case that the first scheduling information includes the difference information between the time-domain resource information for transmitting the first information and the time-domain resource information for transmitting the second information, and/or the difference information between the frequency-domain resource information for transmitting the first information and the frequency-domain resource information for transmitting the second information, multiple pieces of time-domain resource information indicated in the first scheduling information may be determined based on a starting time-domain resource information and the difference information between time-domain resource information. Multiple pieces of frequency-domain resource information indicated in the first scheduling information may be determined based on starting frequency-domain resource information and the difference information between the frequency-domain resource information.

In some embodiments, if the first scheduling information includes the difference information between the time-domain resource information for transmitting the first information and the time-domain resource information for transmitting the second information, the difference information may be added to the time-domain resource information for transmitting the first information, so as to determine the time-domain resource information for transmitting the second information.

In some embodiments, if the first scheduling information includes the difference information between the frequency-domain resource information for transmitting the first information and the frequency-domain resource information for transmitting the second information, the difference information may be added to the frequency-domain resource information for transmitting the first information, so as to determine the frequency-domain resource information for transmitting the second information.

In some embodiments, if the first scheduling information includes the difference information between the time-domain resource information for transmitting the first information and the time-domain resource information for transmitting the second information, and the difference information between the frequency-domain resource information for transmitting the first information and the frequency-domain resource information for transmitting the second information, the difference information may be added to the time-domain resource information for transmitting the first information, so as to determine the time-domain resource information for transmitting the second information; and the difference information may be added to the frequency-domain resource information for transmitting the first information, so as to determine the frequency-domain resource information for transmitting the second information.

if the first scheduling information does not include any one of the difference information between the time-domain resource information for transmitting the first information and the time-domain resource information for transmitting the second information, and the difference information between the frequency-domain resource information for transmitting the first information and the frequency-domain resource information for transmitting the second information, the time-domain resources and the frequency-domain resources indicated in the first scheduling information is required to be represented by fixed time-domain resource information and fixed frequency-domain resource information.

In some embodiments, the time-domain resource information for transmitting the first information and the time-domain resource information for transmitting the second information mentioned above may include at least one of: a starting time-domain position of transmission, a transmission duration, and a transmission period.

The starting time-domain position of transmission may be indicated by a target system frame, a time slot, or a symbol. The transmission duration may be indicated by the number of target system frames, the number of time slots, or the number of symbols. The transmission period may be indicated by the number of target system frames, the number of time slots, the number of symbols, or the number of seconds.

In some embodiments, the transmission mode for transmitting the first information includes at least one of: an encoding mode corresponded when transmitting the first information; a power controlling mode corresponded when transmitting the first information; a frequency hopping mode corresponded when transmitting the first information; and pilot information corresponded when transmitting the first information.

The transmission mode for transmitting the second information includes at least one of: an encoding mode corresponded when transmitting the second information; a power controlling mode corresponded when transmitting the second information; a frequency hopping mode corresponded when transmitting the second information; and pilot information corresponded when transmitting the second information.

In some embodiments, the first scheduling information is carried in Downlink Control Information (DCI), a Physical Downlink Control Channel (PDCCH) command, a Media Access Control (MAC) Control Element (CE), a Radio Resource Control (RRC) message, a reconfiguration message, a broadcast message, a System Information Block (SIB), a Master Information Block (MIB), a Physical Sidelink Share Channel (PSSCH), or a Physical Sidelink Control Channel (PSCCH).

Alternatively, the first scheduling information is transmitted through an Xn interface (a communication interface), or the first scheduling information is transmitted through a sidelink (a transmission mode).

It should be noted that, in some embodiments of the present disclosure, except that the first scheduling information is carried in DCI, the PDCCH command, the MAC CE, the RRC message, the reconfiguration message, the broadcast message, the SIB, the MIB, the PSSCH, or the PSCCH, or is transmitted through the Xn and the sidelink, second scheduling information, third scheduling information, relationship configuration information of a corresponding relationship between the number of pieces of service information included in the first information and the number of pieces of service information included in the second information, which are mentioned in the following embodiments, may also be carried in DCI, the PDCCH command, the MAC CE, the RRC message, the reconfiguration message, the broadcast message, the SIB, the MIB, the PSSCH, or the PSCCH, or be transmitted through the Xn and the sidelink.

In some embodiments, the first device is a network device, and the second device is a terminal device. Alternatively, the first device is a terminal device, and the second device is a network device. Alternatively, the first device is a terminal device, and the second device is another terminal device. Alternatively, the first device is a network device, and the second device is another network device.

In some embodiments, the first device is a terminal device, the second device is another terminal device, information transmitted between the two terminal devices may be carried on the PSSCH or the PSCCH.

In some embodiments, the first device is a network device, the second device is another network device, information may be transmitted between the two network devices through an interface, and the interface may be the Xn interface (a communication interface).

In some embodiments, the first device is a terminal device, the second device is a network device, the transmitted information may be carried in DCI, the PDCCH command, the MAC CE, the RRC message, the reconfiguration message, the broadcast message, the SIB, or the MIB.

The types of the first device and the second device may be applied to any first device and any second device involved in the present disclosure.

The first point to be noted is that, some embodiments of the present disclosure are only illustrated with the first device directly transmitting the first scheduling information to the second device is taken as an example. In some embodiments, the first device firstly obtains the first scheduling information, and then transmits the first scheduling information to the second device.

The second point to be noted is that, the first scheduling information in some embodiments of the present disclosure may for scheduling the resource information and the transmission modes for transmitting the first information for one time and for transmitting the second information for one time, or scheduling the resource information and the transmission modes for transmitting the first information for many times and for transmitting the second information for many times. In the case of transmitting the first information for many times and transmitting the second information for many times, there exists two situations: periodic scheduling and non-periodic scheduling. In the periodic scheduling, an interval between adjacent pieces of time-domain information for transmitting the first information is a preset duration, and an interval between adjacent pieces of time-domain information for transmitting the second information is another preset duration. In non-periodic scheduling, intervals between adjacent pieces of time-domain information for transmitting the first information are different from each other.

In some embodiments, when the first scheduling information is for scheduling the resource information and the transmission modes of transmitting the first information for one time and transmitting the second information for one time, the first device transmits the first information to the second device for one time based on the resource information and the transmission mode for the first information, and the second device transmits the second information to the first device for one time based on the resource information and the transmission mode for the second information. if another transmission between the first device and the second device is required again, the first scheduling information is required to be transmitted again to schedule new resource information and new transmission modes for information transmission.

In some embodiments, the first scheduling information is for periodic scheduling, and the resource information and transmission modes of transmitting the first information for one time and transmitting the second information for one time is scheduled at an interval of a preset duration. In this case, the time-domain resource information in the first scheduling information includes a scheduling period and an effective duration. For example, the first scheduling information is for scheduling a plurality of pieces of time-domain resource information, a interval between adjacent pieces of time-domain resource information configured for the first device to transmit the first information to the second device is a preset duration, and a interval between adjacent pieces of time-domain resource information configured for the second device to transmit the second information to the first device is another preset duration. For example, as shown in FIG. 6, the first scheduling information schedules three sets of time-domain resource information configured for the first device to transmit the first information to the second device and three sets of time-domain resource information configured for the second device to transmit the second information to the first device within a preset duration. Thus, the first device transmits the first information to the second device based on the time-domain resource configured for the first device to transmit the first information to the second device, and the second device transmits the second information to the first device based on the time-domain resource configured for the second device to transmit the second information to the first device.

In some embodiments, the first scheduling information is for non-periodic scheduling, the resource information and the transmission modes scheduled in the first scheduling information include the resource information and the transmission modes of transmitting the first information for many times and transmitting the second information for many times, and the first scheduling information respectively schedules the resource information and the transmission modes for each transmission of the first information and the second information. For example, as shown in FIG. 7, after the first device and the second device transmit the first information and the second information for the first time, the first information is transmitted for the second time after an interval of a first preset duration when the first information is transmitted for the first time, the second information is transmitted for the second time after an interval of a second preset duration when the second information is transmitted for the first time, the first information is transmitted for the third time after an interval of a third preset duration when the first information is transmitted for the second time, and the second information is transmitted for the third time after an interval of a fourth preset duration when the second information is transmitted for the second time.

At 503, the method includes transmitting, by the first device, the first information to the second device based on the first scheduling information.

At 504, the method includes receiving, by the second device, the first information transmitted by the first device based on the first scheduling information.

After the first device transmits the first scheduling information to the second device, both the first device and the second device may determine resource information and the transmission modes for information transmission. Therefore, the first device may transmit the first information to the second device based on the resource information and the transmission mode required for the first device to transmit the first information to the second device, and the second device may receive the first information transmitted by the first device.

At 505, the method includes transmitting, by the second device, the second information to the first device based on the first scheduling information and the first information.

At 506, the method includes receiving, by the first device, the second information transmitted by the second device based on the first scheduling information and the first information.

In some embodiments of the present disclosure, after the first device transmits the first information to the second device, the second device may transmit the second information to the first device based on the resource information and the transmission mode required for transmitting the second information, and the first device may receive the second information transmitted by the second device.

It should be noted that, some embodiments of the present disclosure are firstly illustrated by executing operations 503-506 as an example, and the operations 503-506 are optional operations. In some embodiments, operations 5031-5061 may be executed, instead of the operations 503-506.

At 5031, the method includes transmitting, by the second device, the second information to the first device based on the first scheduling information.

At 5041, the method includes receiving, by the first device, the second information transmitted by the second device based on the first scheduling information.

At 5051, the method includes transmitting, by the first device, the first information to the second device based on the first scheduling information and the second information.

At 5061, the method includes receiving, by the second device, the first information transmitted by the first device based on the first scheduling information and the second information.

The operations 5031-5061 are similar to the aforementioned operations 503-506, which will not be repeated herein.

In the method provided by some embodiments of the present disclosure, as transmitting scheduling information to the second device, the first device may schedule the resource information and the transmission mode for the first device to transmit the first information to the second device, and the resource information and the transmission mode for the second device to transmit the second information to the first device. In this way, the limitation that the first device is required to transmit scheduling information of transmitting the first information and transmitting the second information to the second device respectively may be broken, consumed transmission resources may be reduced, and transmission resources may be saved.

In some embodiments based on FIG. 5, the first device is the network device, the second device is the terminal device. The first information transmitted by the network device to the terminal device is first downlink information, and the information transmitted by the terminal device to the network device is first uplink information. As shown in FIG. 8, the network device firstly transmits the first scheduling information to the terminal device. Then the network device transmits the first downlink information to the terminal device based on the resource information and the transmission mode for the first downlink information. After receiving the first downlink information, the terminal device transmits the first uplink information to the network device based on the resource information and the transmission mode for the first uplink information. The network device receives the first uplink information.

In some embodiments based on FIG. 5, the first device is the network device, and the second device is the terminal device. The first information transmitted by the network device to the terminal device is first downlink information, and the information transmitted by the terminal device to the network device is first uplink information. As shown in FIG. 9, the network device transmits the first scheduling information to the terminal device. The terminal device transmits the first uplink information to the network device based on the resource information and the transmission mode for the first uplink information. After receiving the first uplink information, the network device transmits the first downlink information to the network device based on the resource information and the transmission mode for the first downlink information. The network device receives the first downlink information.

Figure 10:
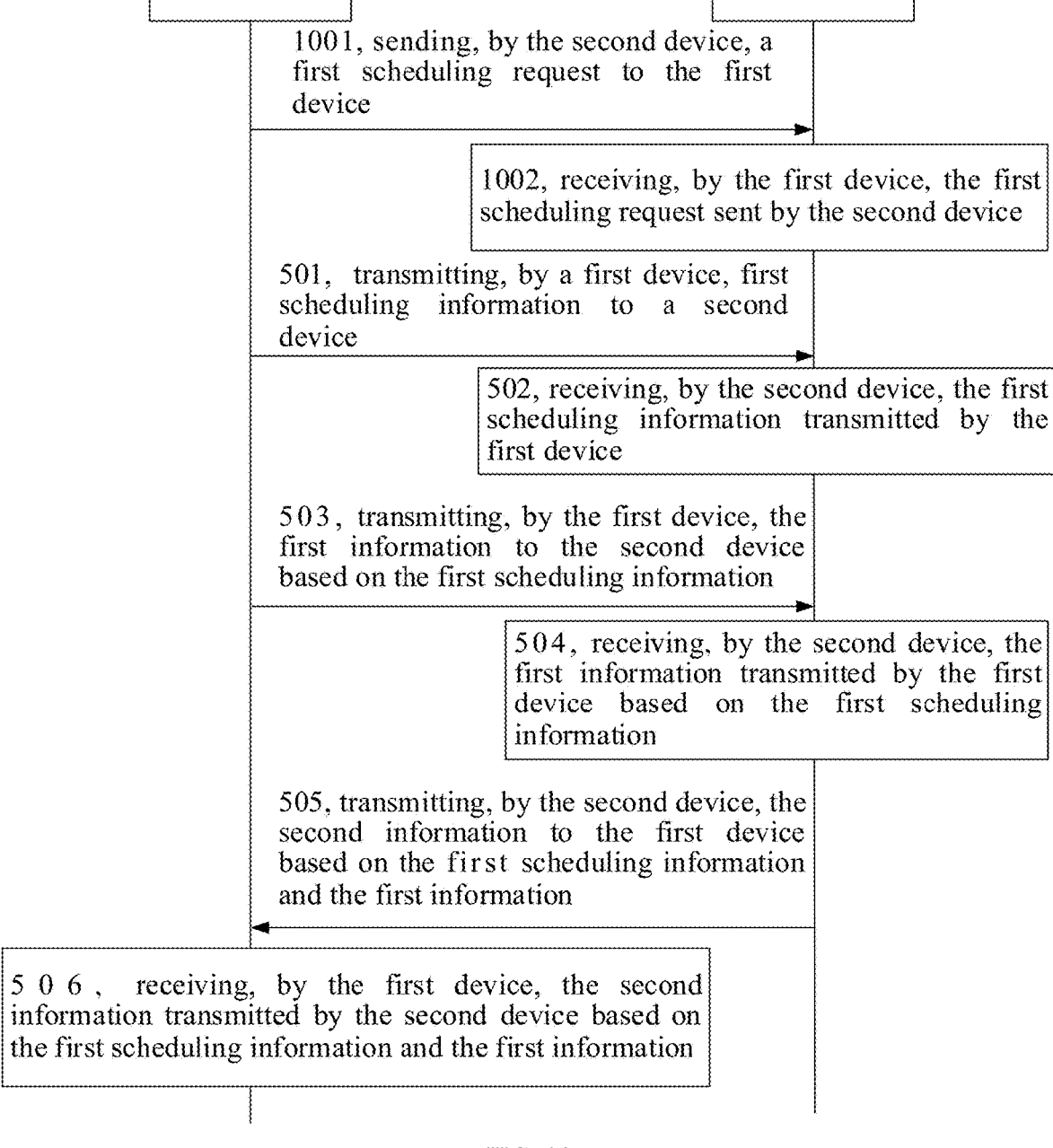
FIG. 10 shows a flow chart of an information transmission method according to some embodiments of the present disclosure.

In some embodiments based on FIG. 5, before the first device executes the operation 501, the first device is required to firstly receive a scheduling request sent by the second device, and then the first device executes the operation 501. Therefore, FIG. 10 shows a flow chart of an information transmission method according to some embodiments of the present disclosure. As shown in FIG. 10, The method includes the following operations.

At 1001, the method includes sending, by the second device, a first scheduling request to the first device.

At 1002, the method includes receiving, by the first device, the first scheduling request sent by the second device.

In some embodiments of the present disclosure, the operations executed by some embodiments shown in FIG. 5 are triggered by the second device. After receiving the first scheduling request sent by the second device, the first device starts to execute the operations of some embodiments shown in FIG. 5.

In case that the second device is required to transmit information with the first device, the second device firstly sends the first scheduling request to the first device. The first device may send the first scheduling information based on the first scheduling request. In this way, both the first device and the second device may determine the resource information and the transmission mode for transmitting the first information, and the resource information and the transmission mode for transmitting the second information, then the transmission of information may be carried out based on the determined resource information and transmission modes.

Figure 11:
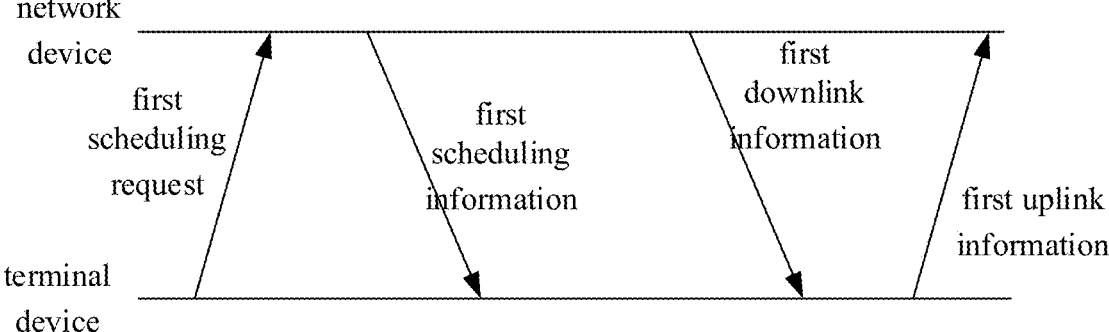
FIG. 11 shows a schematic view of transmitting information between a network device and a terminal device according to some embodiments of the present disclosure.

For example, FIG. 11 is a schematic view of information transmission between the network device and the terminal device based on FIG. 8. The terminal device firstly sends the first scheduling request to the network device, then the network device transmits the first scheduling information to the terminal device. The network device transmits the first downlink information to the terminal device based on the resource information and the transmission mode for the first downlink information. After receiving the first downlink information, the terminal device transmits the first uplink information to the network device based on the resource information and the transmission mode for the first uplink information, and the network device receives the first uplink information.

Figure 12:
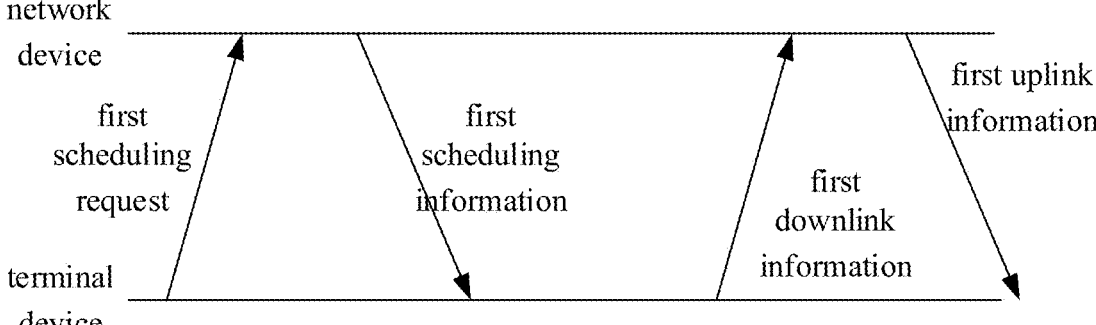
FIG. 12 shows a schematic view of transmitting information between a network device and a terminal device according to some embodiments of the present disclosure.

For another example, FIG. 12 is a schematic view of information transmission between the network device and the terminal device based on FIG. 9. The terminal device firstly sends the first scheduling request to the network device, then the network device transmits the first scheduling information to the terminal device. The terminal device transmits the first uplink information to the network device based on the resource information and the transmission mode for the first uplink information. After receiving the first uplink information, the network device transmits the first downlink information to the network device based on the resource information and the transmission mode for the first downlink information, and the network device receives the first downlink information.

In the method provided by some embodiments of the present disclosure, the second device sends a scheduling request to the first device, then the first device transmits the first scheduling information based on the scheduling request. In this way, a flexible configuration between the first device and the second device may be realized. The method is not limited to the process that only the first device may initiate the transmission of information, and the flexibility of communication between the first device and the second device may be improved.

In some embodiments, the first device includes at least one group of paired second scheduling information and third scheduling information. In each group of paired second scheduling information and third scheduling information, the second scheduling information is configured for the first device to transmit the resource information and the transmission mode for transmitting the first information to the second device, and the third scheduling information is configured for the second device to transmit the resource information and the transmission mode for transmitting the second information to the first device.

Figure 13:
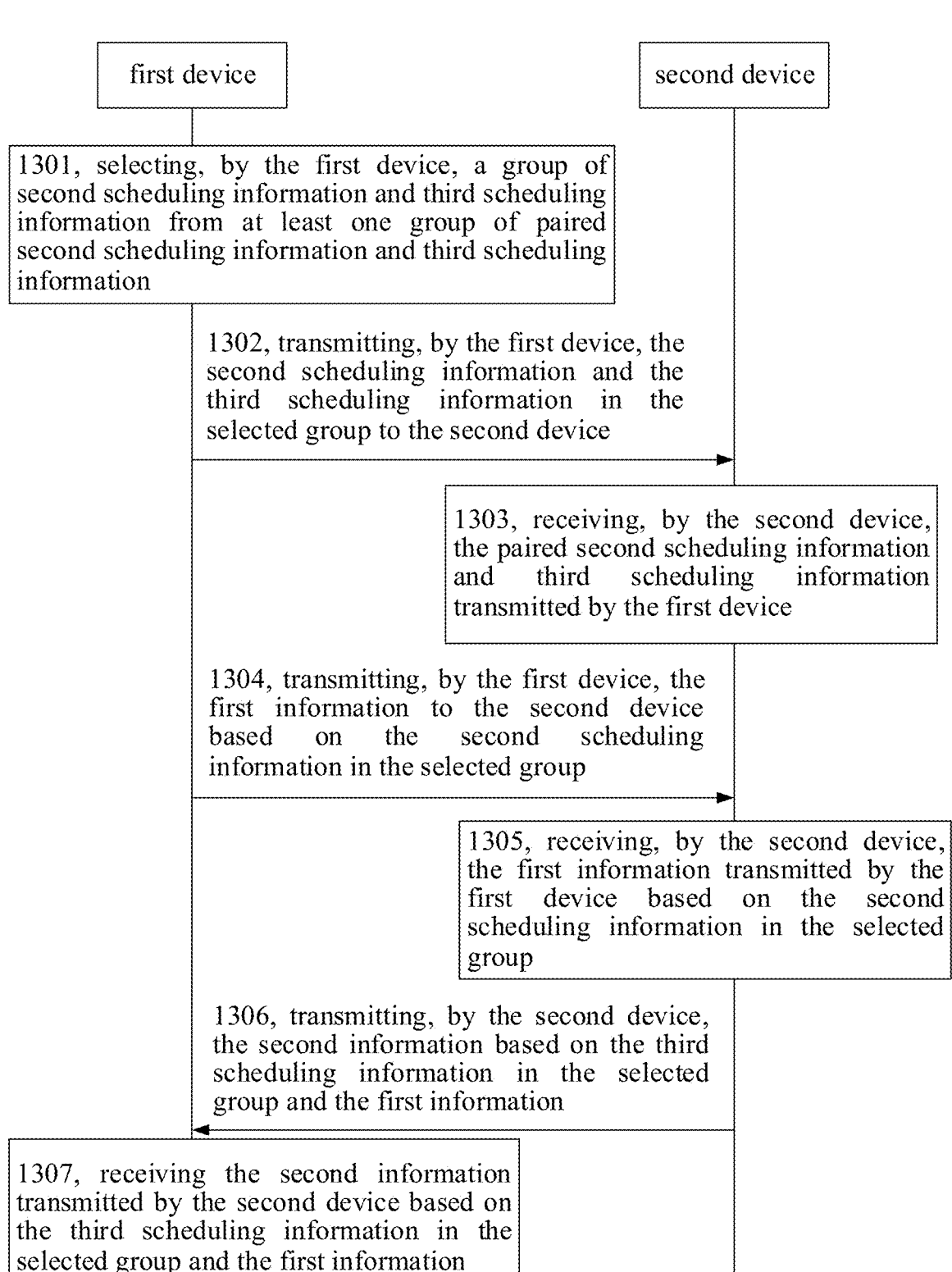
FIG. 13 shows a flow chart of an information transmission method according to some embodiments of the present disclosure.

In some embodiments shown in FIG. 5, as shown in FIG. 13, before the operation 501, the method further includes operation 1301, and the operations 501-506 are replaced by operations 1302-1307.

At 1301, the method includes selecting, by the first device, a group of second scheduling information and third scheduling information from at least one group of paired second scheduling information and third scheduling information.

If information is required to be transmitted between the first device and the second device, the first device selects a group of second scheduling information and third scheduling information from at least one group of paired second scheduling information and third scheduling information, and transmits information based on the resource information and the transmission modes for the group of second scheduling information and third scheduling information.

At 1302, the method includes transmitting, by the first device, the second scheduling information and the third scheduling information in the selected group to the second device.

At 1303, the method includes receiving, by the second device, the paired second scheduling information and third scheduling information transmitted by the first device.

It should be noted that, operations 1302-1303 in some embodiments of the present disclosure are only illustrated by taking the first device transmitting the second scheduling information and the third scheduling information in the selected group to the second device as an example. In some embodiments, the operations 1302-1303 may not be executed, while the first device pre-configures at least one group of paired second scheduling information and third scheduling information for the second device. Then the first device transmits indication information used to indicate a target group of paired second scheduling information and third scheduling information to the second device. The second device may determine the paired second scheduling information and third scheduling information in the selected group based on the indication information.

In some embodiments, the first device configures two groups of paired second scheduling information and third scheduling information, four groups of paired second scheduling information and third scheduling information, or other numbers of groups of paired second scheduling information and third scheduling information for the second device, which is not limited by the embodiments of the present disclosure.

The first device pre-configures multiple groups of paired second scheduling information and third scheduling information for the second device. When communication between the first device and second device being required in the follow-up, the communication may be achieved by transmitting the indication information used to indicate the target group of paired second scheduling information and third scheduling information, and it is not required to transmit the second scheduling information and the third scheduling information every time. In this way, transmission resources may be saved.

At 1304, the method includes transmitting, by the first device, the first information to the second device based on the second scheduling information in the selected group.

At 1305, the method includes receiving, by the second device, the first information transmitted by the first device based on the second scheduling information in the selected group.

At 1306, the method includes transmitting, by the second device, the second information based on the third scheduling information in the selected group and the first information.

At 1307, the method includes receiving, by the first device, the second information transmitted by the second device based on the third scheduling information in the selected group and the first information.

Information transmission processes of operations 1304-1307 are similar to processes of the aforementioned operations 503-506, which will not be repeated herein. In addition, some embodiments of the present disclosure are only illustrated by taking the operations 1304-1307 as an example. In some embodiments, operations 13041-13071 may be executed, instead of the operations 1304-1307.

At 13041, the method includes transmitting, by the second device, the second information to the first device based on the third scheduling information in the selected group.

At 13051, the method includes receiving, by the first device, the second information transmitted by the second device based on the third scheduling information in the selected group.

At 13061, the method includes transmitting, by the first device, the first information to the second device based on the second scheduling information in the selected group and the second information.

At 13071, the method includes receiving, by the second device, the first information transmitted by the first device based on the second scheduling information in the selected group and the second information.

Processes of operations 13041-13071 are similar to processes of the aforementioned operations 1304-1307, which will not be repeated herein.

Figure 14:
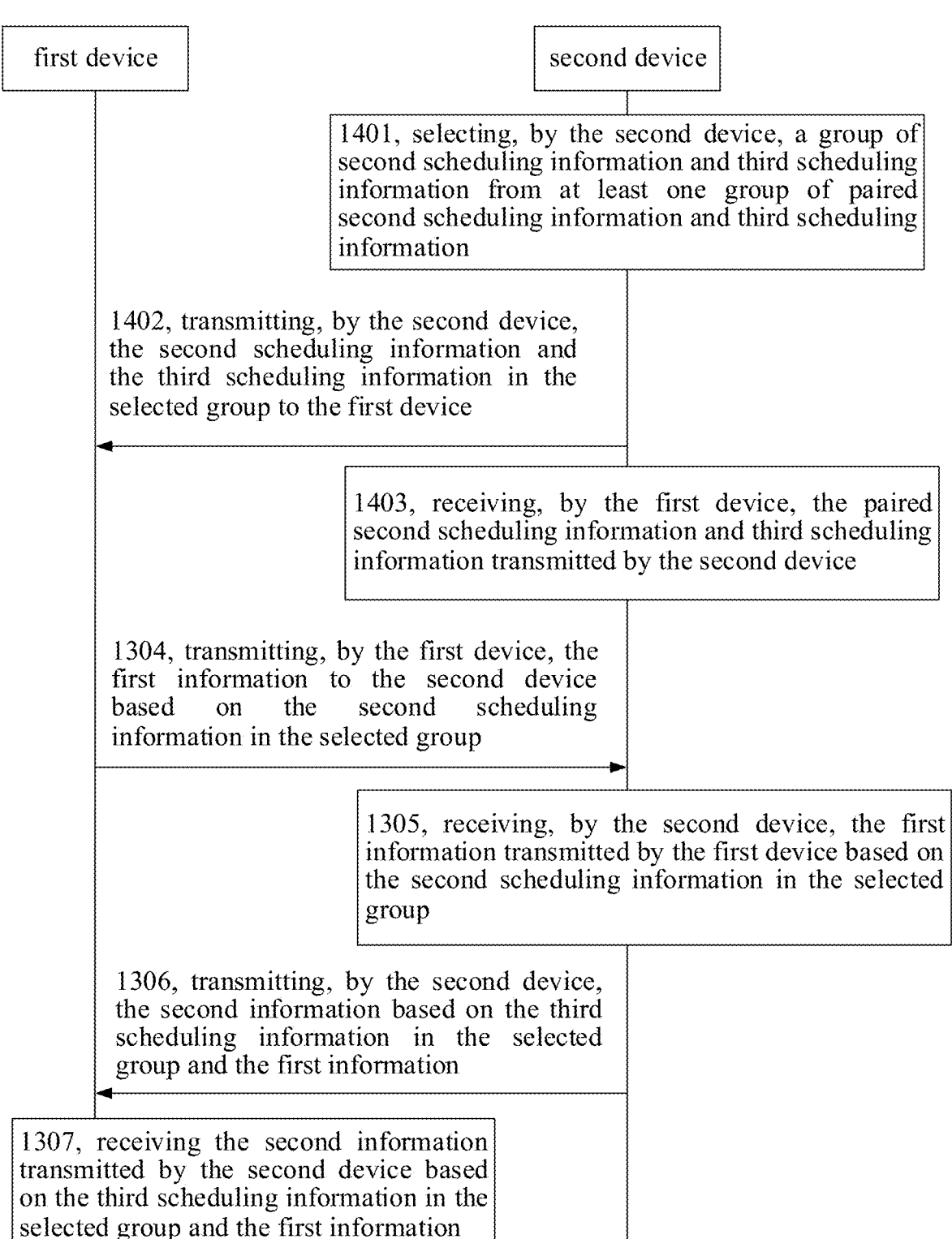
FIG. 14 shows a flow chart of an information transmission method according to some embodiments of the present disclosure.

It should be noted that, some embodiments of the present disclosure are only illustrated by taking the first device transmitting the paired second scheduling information and third scheduling information to the second device as an example. In some embodiment, as shown in FIG. 14, operations 1301-1303 may be replaced by operations 1401-1403.

At 1401, the method includes selecting, by the second device, a group of second scheduling information and third scheduling information from at least one group of paired second scheduling information and third scheduling information.

At 1402, the method includes transmitting, by the second device, the second scheduling information and the third scheduling information in the selected group to the first device.

At 1403, the method includes receiving, by the first device, the paired second scheduling information and third scheduling information transmitted by the second device.

Processes of operations 1401-1403 are similar to processes of aforementioned operations 1301-1303, which will not be repeated herein.

It should be noted that, operations 1402-1403 in some embodiment of the present disclosure are only illustrated by taking the second device transmitting the second scheduling information and the third scheduling information in the selected group to the first device as an example. In some embodiments, operations 1402-1403 may not be executed, while the second device pre-configures at least one group of paired second scheduling information and third scheduling information for the first device. Then the second device transmits indication information used to indicate a target group of paired second scheduling information and third scheduling information to the first device. The first device may determine the paired second scheduling information and third scheduling information in the selected group based on the indication information.

In the method provided by some embodiments of the present disclosure, the first device or the second device selects a group of second scheduling information and third scheduling information from at least one group of paired second scheduling information and the third scheduling information. The first device and the second device transmit the first information and the second information based on the second scheduling information and the third scheduling information. In this way, the limitation that the first device is required to respectively transmit scheduling information of transmitting the first information and transmitting the second information to the second device may be broken, the consumed transmission resources may be reduced, and the transmission resources may be saved.

In some embodiments, the first information includes one or more pieces of service information, and the second information includes one or more pieces of service information. In the process of transmitting the first information and the second information between the first device and the second device, any one of the following situations may be included.

In a first situation, one piece of service information transmitted from the first device to the second device corresponds to one piece of service information transmitted from the second device to the first device. For example, both FIGS. 7 and 8, show that one piece of service information transmitted from the first device to the second device corresponds to one piece of service information transmitted from the second device to the first device.

Figures 15, 16, 17, 18:
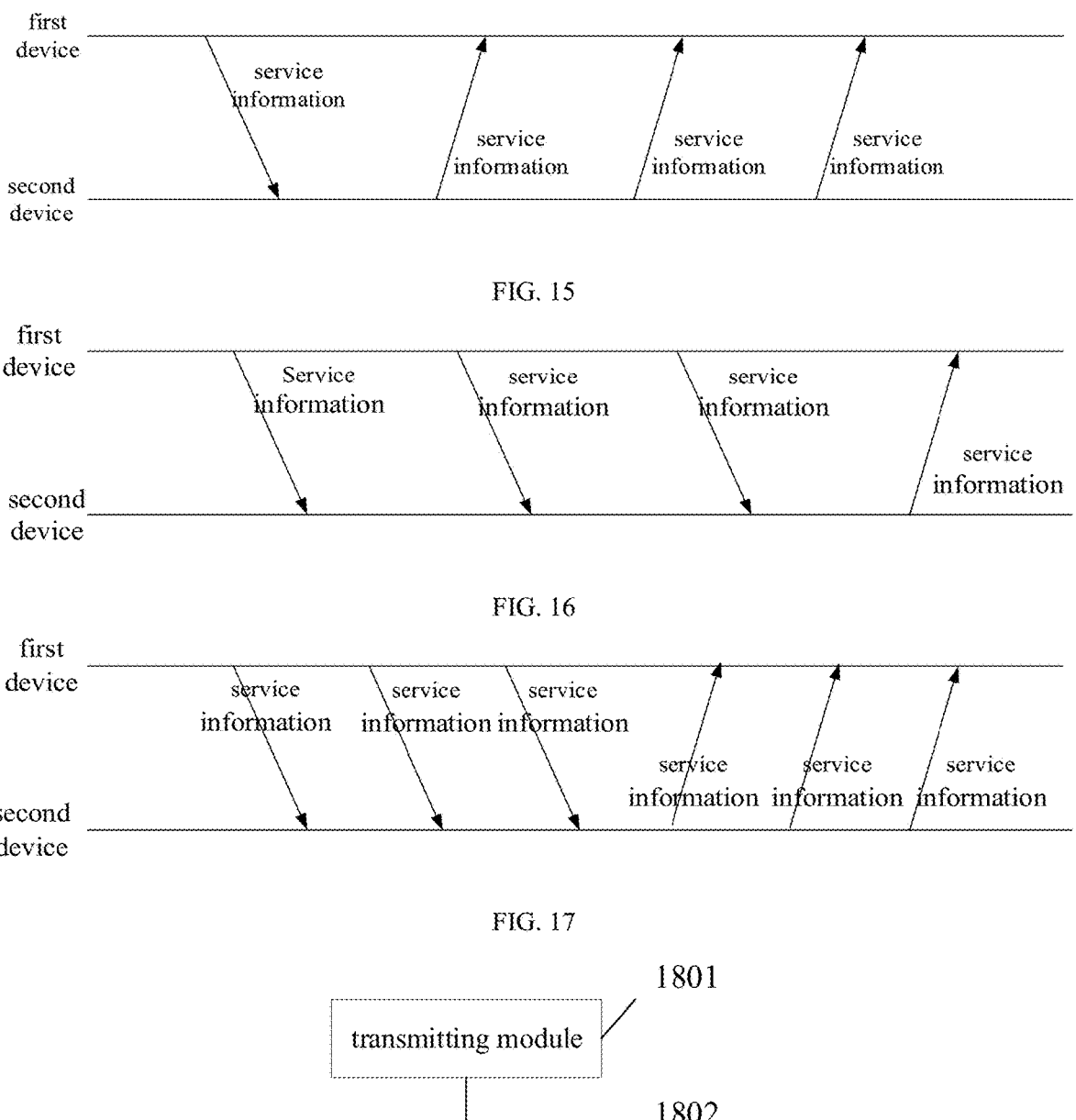
FIG. 15 shows a schematic view of transmitting information between a first device and a second device according to some embodiments of the present disclosure.
FIG. 16 shows a schematic view of transmitting information between a first device and a second device according to some embodiments of the present disclosure.
FIG. 17 shows a schematic view of transmitting information between a first device and a second device according to some embodiments of the present disclosure.
FIG. 18 shows a block diagram of an information transmission apparatus according to some embodiments of the present disclosure.

In a second situation, one piece of service information transmitted from the first device to the second device corresponds to multiple pieces of service information transmitted from the second device to the first device. For example, as shown in FIG. 15, the first device transmits one piece of service information to the second device, and the second device transmits three pieces of service information to the first device based on the one piece of service information.

In a third situation, multiple pieces of service information transmitted from the first device to the second device correspond to one piece of service information transmitted from the second device to the first device. For example, as shown in FIG. 16, the first device transmits three pieces of service information to the second device, and the second device transmits one piece of service information to the first device based on the three pieces of service information.

In a fourth situation, multiple pieces of service information transmitted from the first device to the second device correspond to multiple pieces of service information transmitted from the second device to the first device. For example, as shown in FIG. 17, the first device transmits three pieces of service information to the second device, and the second device transmits three pieces of service information to the first device based on the three pieces of service information transmitted from the first device to the second device.

It should be noted that, some embodiments of the present disclosure only illustrate a corresponding relationship between the number of the pieces of service information included in the first information and the number of the pieces of service information included in the second information. In some embodiments, the corresponding relationship between the number of the pieces of service information included in the first information and the number of the pieces of service information included in the second information may also be pre-configured by the relationship configuration information.

The carrying modes of the relationship configuration information have been explained in the afore-mentioned embodiments shown in FIG. 5, which will not be repeated herein.

In the method provided by some embodiments of the present disclosure, the first information transmitted from the first device to the second device includes one or more pieces of service information, and the second information transmitted from the second device to the first device includes one or more pieces of service information. In this way, the method may transmit different amounts of pieces of service information in different transmission scenarios, the universality of applicable scenarios may be ensured, and transmission effect may be improved.

FIG. 18 shows a block diagram of an information transmission apparatus according to some embodiments of the present disclosure. The apparatus is applied in a first device, and includes: a transmitting module 1801, configured to transmit first scheduling information to a second device, the first scheduling information is configured to indicate resource information and a transmission mode for transmitting first information, and resource information and a transmission mode for transmitting second information; and a receiving module 1802, wherein the transmitting module 1801 is configured to transmit the first information to the second device based on the first scheduling information, and the receiving module 1802 is configured to receive the second information transmitted by the second device based on the first scheduling information and the first information; or wherein the receiving module 1802 is configured to receive the second information transmitted by the second device based on the first scheduling information, and the transmitting module is configured to transmit the first information to the second device based on the first scheduling information and the second information.

In some embodiments, the resource information for transmitting the first information includes at least one of: time-domain resource information for transmitting the first information; and frequency-domain resource information for transmitting the first information; the resource information for transmitting the second information includes at least one of: time-domain resource information for transmitting the second information; and frequency-domain resource information for transmitting the second information; the first scheduling information further includes: difference information between the time-domain resource information for transmitting the first information and the time-domain resource information for transmitting the second information; and difference information between the frequency-domain resource information for transmitting the first information and the frequency-domain resource information for transmitting the second information.

In some embodiments, the transmission mode for transmitting the first information includes at least one of: an encoding mode corresponded when transmitting the first information; a power controlling mode corresponded when transmitting the first information; a frequency hopping mode corresponded when transmitting the first information; and pilot information corresponded when transmitting the first information; the transmission mode for transmitting the second information includes at least one of: an encoding mode corresponded when transmitting the second information; a power controlling mode corresponded when transmitting the second information; a frequency hopping mode corresponded when transmitting the second information; and pilot information corresponded when transmitting the second information.

In some embodiments, each of the time-domain resource information for transmitting the first information and the time-domain resource information for transmitting the second information includes at least one of: a starting time-domain position of transmission, a transmission duration, and a transmission period.

In some embodiments, the first scheduling information is carried in Downlink Control Information (DCI), a Physical Downlink Control Channel (PDCCH) command, a Media Access Control (MAC) Control Element (CE), a Radio Resource Control (RRC) message, a reconfiguration message, a broadcast message, a System Information Block (SIB), a Master Information Block (MIB), a Pysical Sidelink Share Channel (PSSCH), or a Pysical Sidelink Control Channl (PSCCH); or the first scheduling information is transmitted through a Xn interface; or the first scheduling information is transmitted through a sidelink.

In some embodiments, the receiving module 1802 is configured to receive a first scheduling request sent by the second device.

Figure 19:
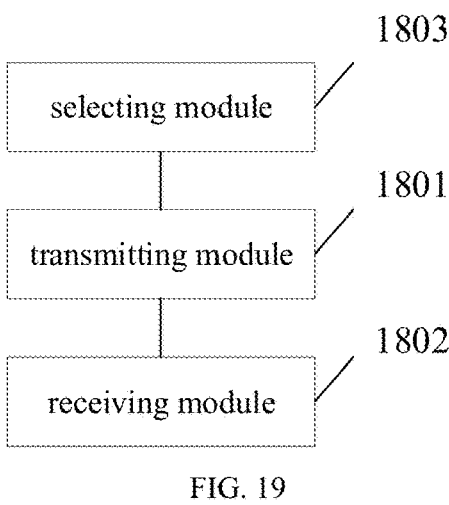
FIG. 19 shows a block diagram of an information transmission apparatus according to some embodiments of the present disclosure.

In some embodiments, as shown in FIG. 19, the apparatus further includes: a selecting module 1803, configured to select a group of second scheduling information and third scheduling information from at least one group of paired second scheduling information and third scheduling information, the second scheduling information is configured for the first device to transmit the resource information and the transmission mode for transmitting the first information to the second device, and the third scheduling information is configured for the second device to transmit the resource information and the transmission mode for transmitting the second information to the first device; the transmitting module 1801 is configured to transmit the second scheduling information and the third scheduling information in the selected group to the second device; the transmitting module 1801 is configured to transmit the first information to the second device based on the second scheduling information in the selected group, and the receiving module 1802 is configured to receive the second information transmitted by the second device based on the third scheduling information in the selected group and the first information; or the receiving module 1802 is configured to receive the second information transmitted by the second device based on the third scheduling information in the selected group, and the transmitting module 1801 is configured to transmit the first information to the second device based on the second scheduling information in the selected group and the second information.

In some embodiments, the first information includes one or more pieces of service information, and the second information includes one or more pieces of service information.

In some embodiments, the first device is a network device, and the second device is a terminal device; or the first device is a network device, and the second device is a terminal device; or the first device is a terminal device, and the second device is another terminal device; or the first device is a network device, and the second device is another network device.

Figure 20:
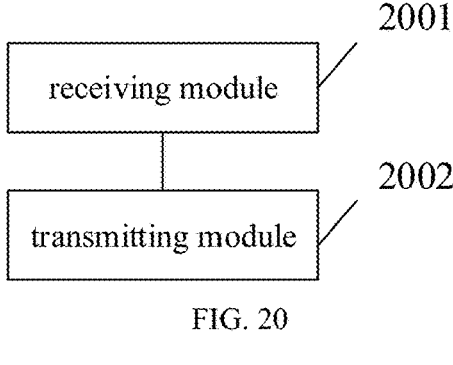
FIG. 20 shows a block diagram of an information transmission apparatus according to some embodiments of the present disclosure.

FIG. 20 shows a block diagram of an information transmission apparatus according to some embodiments of the present disclosure. The apparatus is applied in a second device, and includes: a receiving module 2001, configured to receive first scheduling information transmitted by a first device, the first scheduling information is configured to indicate resource information and a transmission mode for transmitting first information, and resource information and a transmission mode for transmitting second information; and a transmitting module 2002, wherein the receiving module 2001 is configured to receive the first information transmitted by the first device based on the first scheduling information, and the transmitting module 2002 is configured to transmit the second information to the first device based on the first scheduling information and the first information; or wherein the transmitting module 2002 is configured to transmit the second information to the first device based on the first scheduling information, and the receiving module 2001 is configured to receive the first information transmitted by the first device based on the first scheduling information and the second information.

In some embodiments, the resource information for transmitting the first information includes at least one of: time-domain resource information for transmitting the first information; and frequency-domain resource information for transmitting the first information; the resource information for transmitting the second information includes at least one of: time-domain resource information for transmitting the second information; and frequency-domain resource information for transmitting the second information; the first scheduling information further includes: difference information between the time-domain resource information for transmitting the first information and the time-domain resource information for transmitting the second information; and difference information between the frequency-domain resource information for transmitting the first information and the frequency-domain resource information for transmitting the second information.

In some embodiments, the transmission mode for transmitting the first information includes at least one of: an encoding mode corresponded when transmitting the first information; a power controlling mode corresponded when transmitting the first information; a frequency hopping mode corresponded when transmitting the first information; and pilot information corresponded when transmitting the first information; the transmission mode for transmitting the second information includes at least one of: an encoding mode corresponded when transmitting the second information; a power controlling mode corresponded when transmitting the second information; a frequency hopping mode corresponded when transmitting the second information; and pilot information corresponded when transmitting the second information.

In some embodiments, each of the time-domain resource information for transmitting the first information and the time-domain resource information for transmitting the second information includes at least one of: a starting time-domain position of transmission, a transmission duration, and a transmission period.

In some embodiments, the first scheduling information is carried in Downlink Control Information (DCI), a Physical Downlink Control Channel (PDCCH) command, a Media Access Control (MAC) Control Element (CE), a Radio Resource Control (RRC) message, a reconfiguration message, a broadcast message, a System Information Block (SIB), a Master Information Block (MIB), a Pysical Sidelink Share Channel (PSSCH), or a Pysical Sidelink Control Channl (PSCCH); or the first scheduling information is transmitted through a Xn interface; or the first scheduling information is transmitted through a sidelink.

In some embodiments, the transmitting module 2002 is configured to send a first scheduling request to the first device.

In some embodiments, the receiving module 2001 is configured to receive paired second scheduling information and third scheduling information transmitted by the first device, the paired second scheduling information and third scheduling information is a group selected by the first device from at least one group of paired second scheduling information and third scheduling information, the second scheduling information is configured for the first device to transmit the resource information and the transmission mode for transmitting the first information to the second device, and the third scheduling information is configured for the second device to transmit the resource information and the transmission mode for transmitting the second information to the first device; the receiving module 2001 is configured to receive the first information transmitted by the first device based on the second scheduling information in the selected group, and the transmitting module 2002 is configured to transmit the second information based on the third scheduling information in the selected group and the first information; or the transmitting module 2002 is configured to transmit the second information to the first device based on the third scheduling information in the selection group, and the receiving module 2001 is configured to receive the first information transmitted by the first device based on the second scheduling information in the selected group and the second information.

In some embodiments, the first information includes one or more pieces of service information, and the second information includes one or more pieces of service information.

In some embodiments, the first device is a network device, and the second device is a terminal device; or the first device is a network device, and the second device is a terminal device; or the first device is a terminal device, and the second device is another terminal device; or the first device is a network device, and the second device is another network device.

Figure 21:
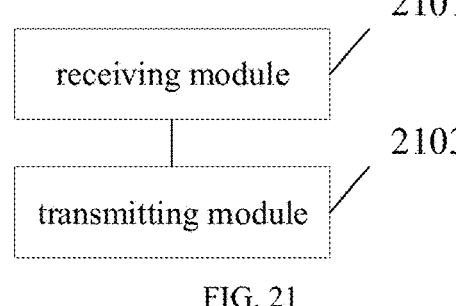
FIG. 21 shows a block diagram of an information transmission apparatus according to some embodiments of the present disclosure.

FIG. 21 shows a block diagram of an information transmission apparatus according to some embodiments of the present disclosure. The apparatus is applied to a first device, and includes: a receiving module 2101, configured to receive paired second scheduling information and third scheduling information transmitted by a second device, the paired second scheduling information and third scheduling information is a group selected by the second device from at least one group of paired second scheduling information and third scheduling information, the second scheduling information is configured for the first device to transmit resource information and a transmission mode for transmitting first information to the second device, and the third scheduling information is configured for the second device to transmit resource information and a transmission mode for transmitting second information to the first device; and a transmitting module 2102, wherein the transmitting module 2102 is configured to transmit the first information to the second device based on the second scheduling information in the selected group, and the receiving module 2101 is configured to receive the second information transmitted by the second device based on the third scheduling information in the selected group and the first information; or wherein the receiving module 2101 is configured to receive the second information transmitted by the second device based on the third scheduling information in the selected group, and the transmitting module is configured to transmit the first information to the second device based on the second scheduling information in the selected group and the second information.

In some embodiments, each of the second scheduling information and the third scheduling information is carried in Downlink Control Information (DCI), a Physical Downlink Control Channel (PDCCH) command, a Media Access Control (MAC) Control Element (CE), a Radio Resource Control (RRC) message, a reconfiguration message, a broadcast message, a System Information Block (SIB), a Master Information Block (MIB), a Pysical Sidelink Share Channel (PSSCH), or a Pysical Sidelink Control Channl (PSCCH); or each of the second scheduling information and the third scheduling information is transmitted through a Xn interface; or each of the second scheduling information and the third scheduling information is transmitted through a sidelink.

In some embodiments, the first information includes one or more pieces of service information, and the second information includes one or more pieces of service information.

In some embodiments, the first device is a network device, and the second device is a terminal device; or the first device is a network device, and the second device is a terminal device; or the first device is a terminal device, and the second device is another terminal device; or the first device is a network device, and the second device is another network device.

Figure 22:
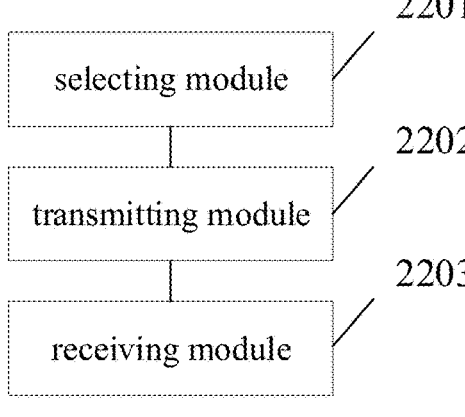
FIG. 22 shows a block diagram of an information transmission apparatus according to some embodiments of the present disclosure.

FIG. 22 shows a block diagram of the information transmission apparatus according to some embodiments of the present disclosure. The apparatus is applied in a second device, and includes: a selecting module 2201, configured to select a group of second scheduling information and third scheduling information from at least one group of paired second scheduling information and third scheduling information, wherein the second scheduling information is configured for a first device to transmit resource information and a transmission mode for transmitting first information to the second device, and the third scheduling information is configured for the second device to transmit resource information and a transmission mode for transmitting second information to the first device; a transmitting module 2202, configured to transmit the second scheduling information and the third scheduling information in the selected group to the first device; and a receiving module 2203, wherein the receiving module 2203 is configured to receive the first information transmitted by the first device based on the second scheduling information in the selected group, and the transmitting module 2202 is configured to transmit the second information to the first device based on the third scheduling information in the selected group and the first information; or wherein the transmitting module 2202 is configured to transmit the second information to the first device based on the third scheduling information in the selected group, and the receiving module 2203 is configured to receive the first information transmitted by the first device based on the second scheduling information in the selected group and the second information.

In some embodiments, each of the second scheduling information and the third scheduling information is carried in Downlink Control Information (DCI), a Physical Downlink Control Channel (PDCCH) command, a Media Access Control (MAC) Control Element (CE), a Radio Resource Control (RRC) message, a reconfiguration message, a broadcast message, a System Information Block (SIB), a Master Information Block (MIB), a Pysical Sidelink Share Channel (PSSCH), or a Pysical Sidelink Control Channl (PSCCH); or each of the second scheduling information and the third scheduling information is transmitted through a Xn interface; or each of the second scheduling information and the third scheduling information is transmitted through a sidelink.

In some embodiments, the first information includes one or more pieces of service information, and the second information includes one or more pieces of service information.

In some embodiments, the first device is a network device, and the second device is a terminal device; or the first device is a network device, and the second device is a terminal device; or the first device is a terminal device, and the second device is another terminal device; or the first device is a network device, and the second device is another network device.

Figure 23:
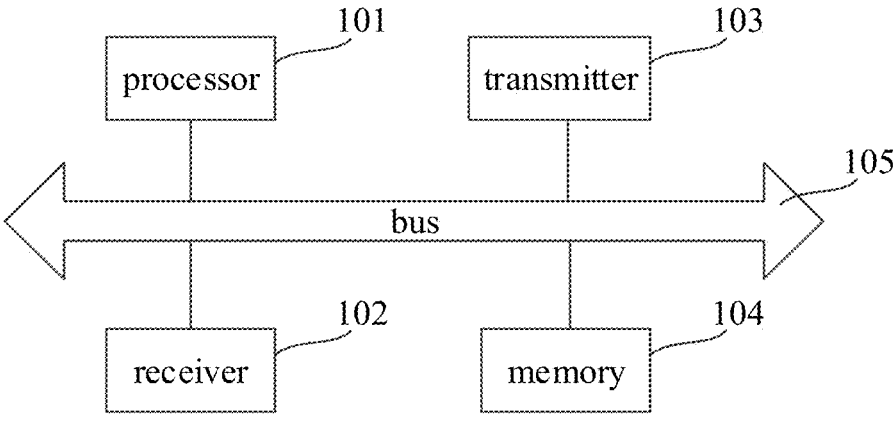
FIG. 23 shows a structural schematic view of a communication device according to some embodiments of the present disclosure.

FIG. 23 shows a schematic structural view of a communication device (the first device or the second device) according to some embodiments of the present disclosure. The communication device includes a processor 101, a receiver 102, a transmitter 103, a memory 104, and a bus 105.

The processor 101 includes one or more processing cores. The processor 101 may execute various functional applications and information processing by running software programs and modules.

The receiver 102 and the transmitter 103 may be implemented as one communication assembly, and the communication assembly may be a communication chip.

The memory 104 is connected to the processor 101 through the bus 105.

The memory 104 may be configured to store at least one instruction, and the processor 101 is configured to execute the at least one instruction to execute various operations in the aforementioned method embodiments.

In addition, the memory 104 may be implemented by any type of volatile or non-volatile storage devices, or a combination thereof. The volatile or non-volatile storage devices include but are not limited to: a magnetic disk or an optical disk, an Electrically Erasable Programmable Read-Only Memory (EEPROM), an Erasable Programmable Read-Only Memory (EPROM), a Static Anytime Access Memory (SRAM), a Read-Only Memory (ROM), a magnetic memory, a flash memory, or a Programmable Read-Only Memory (PROM).

In some embodiments, a computer-readable storage medium is also provided. The readable storage medium stores an executable program code, the executable program code is loaded and executed by a processor to execute the information transmission method performed by the first device or the second device and provided by any one of the afore-mentioned method embodiments.

In some embodiments, a chip is also provided. The chip includes programmable logic circuits and/or program instructions. In response to running on the first device or the second device, the chip is configured to execute any one of the aforementioned information transmission methods.

In some embodiments, a computer program product is also provided. In response to being executed by a processor of the first device or the second device, the computer program product is configured to execute any one of the aforementioned information transmission methods.

Those skilled in the art may understand that all or part of the operations to execute the aforementioned embodiments may be implemented by hardware, or by instructing relevant hardware through programs. The programs may be stored in a computer-readable storage medium, which may be a Read-Only Memory, a magnetic disk, or an optical disk, etc.

The above is only some embodiments of the present disclosure, and is not intended to limit the present disclosure. Any modification, equivalent replacement, improvement, etc., made within the spirit and principles of the present disclosure should be included in the protection scope of the present disclosure.

What is claimed is:

1. An information transmission method performed by a first device, comprising:

transmitting first scheduling information to a second device, wherein the first scheduling information is configured to indicate first resource information and a first transmission mode for transmitting first information, and second resource information and a second transmission mode for transmitting second information;

transmitting the first information to the second device based on the first scheduling information, and receiving the second information transmitted by the second device based on the first scheduling information and the first information; or receiving the second information transmitted by the second device based on the first scheduling information, and transmitting the first information to the second device based on the first scheduling information and the second information, wherein the first resource information for transmitting the first information comprises at least one of:

first time-domain resource information for transmitting the first information; and first frequency-domain resource information for transmitting the first information;

the second resource information for transmitting the second information comprises at least one of:

second time-domain resource information for transmitting the second information; and second frequency-domain resource information for transmitting the second information;

the first scheduling information comprises:

first difference information between the first time-domain resource information for transmitting the first information and the second time-domain resource information for transmitting the second information; and second difference information between the first frequency-domain resource information for transmitting the first information and the second frequency-domain resource information for transmitting the second information.

2. The method as claimed in claim 1, wherein the first transmission mode for transmitting the first information comprises at least one of:

a first encoding mode corresponded when transmitting the first information;

a first power controlling mode corresponded when transmitting the first information;

a first frequency hopping mode corresponded when transmitting the first information; and first pilot information corresponded when transmitting the first information;

the second transmission mode for transmitting the second information comprises at least one of:

a second encoding mode corresponded when transmitting the second information;

a second power controlling mode corresponded when transmitting the second information;

a second frequency hopping mode corresponded when transmitting second information; and second pilot information corresponded when transmitting the second information.

3. The method as claimed in claim 1, wherein each of the first time-domain resource information for transmitting the first information and the second time-domain resource information for transmitting the second information comprises at least one of:

a starting time-domain position of transmission, a transmission duration, and a transmission period.

4. The method as claimed in claim 1, wherein the first scheduling information is carried in Downlink Control Information (DCI), a Physical Downlink Control Channel (PDCCH) command, a Media Access Control (MAC) Control Element (CE), a Radio Resource Control (RRC) message, a reconfiguration message, a broadcast message, a System Information Block (SIB), a Master Information Block (MIB), a Pysical Sidelink Share Channel (PSSCH), or a Pysical Sidelink Control Channl (PSCCH); or the first scheduling information is transmitted through a Xn interface; or the first scheduling information is transmitted through a sidelink.

5. The method as claimed in claim 1, wherein before the transmitting first scheduling information to a second device, the method further comprises:

receiving a first scheduling request sent by the second device.

6. The method as claimed in claim 1, wherein the method further comprises:

selecting a group of second scheduling information and third scheduling information from at least one group of paired second scheduling information and third scheduling information, wherein the second scheduling information is configured for the first device to transmit the first resource information and the first transmission mode for transmitting the first information to the second device, and the third scheduling information is configured for the second device to transmit the second resource information and the second transmission mode for transmitting the second information to the first device;

the transmitting first scheduling information to a second device comprises:

transmitting the second scheduling information and the third scheduling information in the selected group to the second device;

the transmitting the first information to the second device based on the first scheduling information, and receiving the second information transmitted by the second device based on the first scheduling information and the first information, comprises:

transmitting the first information to the second device based on the second scheduling information in the selected group, and receiving the second information transmitted by the second device based on the third scheduling information in the selected group and the first information; or the receiving the second information transmitted by the second device based on the first scheduling information, and transmitting the first information to the second device based on the first scheduling information and the second information, comprises:

receiving the second information transmitted by the second device based on the third scheduling information in the selected group, and transmitting the first information to the second device based on the second scheduling information in the selected group and the second information.

7. The method as claimed in claim 1, wherein the first information comprises one or more pieces of service information, and the second information comprises one or more pieces of service information.

8. The method as claimed in claim 1, wherein the first device is a network device, and the second device is a terminal device; or the first device is a network device, and the second device is a terminal device; or the first device is a terminal device, and the second device is another terminal device; or the first device is a network device, and the second device is another network device.

9. An information transmission method performed by a second device, comprising:

receiving first scheduling information transmitted by a first device, wherein the first scheduling information is configured to indicate first resource information and a first transmission mode for transmitting first information, and second resource information and a second transmission mode for transmitting second information;

receiving the first information transmitted by the first device based on the first scheduling information, and transmitting the second information to the first device based on the first scheduling information and the first information; or transmitting the second information to the first device based on the first scheduling information, and receiving the first information transmitted by the first device based on the first scheduling information and the second information, wherein the first resource information for transmitting the first information comprises at least one of:

first time-domain resource information for transmitting the first information; and first frequency-domain resource information for transmitting the first information;

the second resource information for transmitting the second information comprises at least one of:

second time-domain resource information for transmitting the second information; and second frequency-domain resource information for transmitting the second information;

the first scheduling information comprises:

first difference information between the first time-domain resource information for transmitting the first information and the second time-domain resource information for transmitting the second information; and second difference information between the first frequency-domain resource information for transmitting the first information and the second frequency-domain resource information for transmitting the second information.

10. The method as claimed in claim 9, wherein the first transmission mode for transmitting the first information comprises at least one of:

a first encoding mode corresponded when transmitting the first information;

a first power controlling mode corresponded when transmitting the first information;

a first frequency hopping mode corresponded when transmitting the first information; and first pilot information corresponded when transmitting the first information;

the second transmission mode for transmitting the second information comprises at least one of:

a second encoding mode corresponded when transmitting the second information;

a second power controlling mode corresponded when transmitting the second information;

a second frequency hopping mode corresponded when transmitting the second information; and second pilot information corresponded when transmitting the second information.

11. The method as claimed in claim 9, wherein each of the first time-domain resource information for transmitting the first information and the second time-domain resource information for transmitting the second information comprises at least one of: a starting time-domain position of transmission, a transmission duration, and a transmission period.

12. The method as claimed in claim 9, wherein the first scheduling information is carried in a Downlink Control Information (DCI), a Physical Downlink Control Channel (PDCCH) command, a Media Access Control (MAC) Control Element (CE), a Radio Resource Control (RRC) message, a reconfiguration message, a broadcast message, a System Information Block (SIB), a Master Information Block (MIB), a Pysical Sidelink Share Channel (PSSCH), or a Pysical Sidelink Control Channl (PSCCH); or the first scheduling information is transmitted through a Xn interface; or the first scheduling information is transmitted through a sidelink.

13. The method as claimed in claim 9, wherein before the receiving first scheduling information transmitted by a first device, the method further comprises:

sending a first scheduling request to the first device.

14. The method as claimed in claim 9, wherein the receiving first scheduling information transmitted by a first device comprises:

receiving paired second scheduling information and third scheduling information transmitted by the first device, wherein the paired second scheduling information and third scheduling information is a group selected by the first device from at least one group of paired second scheduling information and third scheduling information, the second scheduling information is configured for the first device to transmit the first resource information and the first transmission mode for transmitting the first information to the second device, and the third scheduling information is configured for the second device to transmit the second resource information and the second transmission mode for transmitting the second information to the first device;

the receiving the first information transmitted by the first device based on the first scheduling information, and transmitting the second information to the first device based on the first scheduling information and the first information, comprises:

receiving the first information transmitted by the first device based on the second scheduling information in the selected group, and transmitting the second information based on the third scheduling information in the selected group and the first information; or the transmitting the second information to the first device based on the first scheduling information, and receiving the first information transmitted by the first device based on the first scheduling information and the second information, comprises:

transmitting the second information to the first device based on the third scheduling information in the selection group, and receiving the first information transmitted by the first device based on the second scheduling information in the selected group and the second information.

15. The method as claimed in claim 9, wherein the first information comprises one or more pieces of service information, and the second information comprises one or more pieces of service information.

16. The method as claimed in claim 9, wherein the first device is a network device, and the second device is a terminal device; or the first device is a network device, and the second device is a terminal device; or the first device is a terminal device, and the second device is another terminal device; or the first device is a network device, and the second device is another network device.

17. An information transmission method performed by a first device, comprising:

receiving paired second scheduling information and third scheduling information transmitted by a second device, wherein the paired second scheduling information and third scheduling information is a group selected by the second device from at least one group of paired second scheduling information and third scheduling information, the second scheduling information is configured for the first device to transmit first resource information and a first transmission mode for transmitting first information to the second device, and the third scheduling information is configured for the second device to transmit second resource information and a second transmission mode for transmitting second information to the first device;

transmitting the first information to the second device based on the second scheduling information in the selected group, and receiving the second information transmitted by the second device based on the third scheduling information in the selected group and the first information; or receiving the second information transmitted by the second device based on the third scheduling information in the selected group, and transmitting the first information to the second device based on the second scheduling information in the selected group and the second information.

18. The method as claimed in claim 17, wherein each of the second scheduling information and the third scheduling information is carried in Downlink Control Information (DCI), a Physical Downlink Control Channel (PDCCH) command, a Media Access Control (MAC) Control Element (CE), a Radio Resource Control (RRC) message, a reconfiguration message, a broadcast message, a System Information Block (SIB), a Master Information Block (MIB), a Pysical Sidelink Share Channel (PSSCH), or a Pysical Sidelink Control Channl (PSCCH); or each of the second scheduling information and the third scheduling information is transmitted through a Xn interface; or each of the second scheduling information and the third scheduling information is transmitted through a sidelink.

* * * * *